(12) United States Patent
McGuffin

(10) Patent No.: US 11,623,877 B1
(45) Date of Patent: Apr. 11, 2023

(54) LOW PRESSURE AIR-GAS MIXING APPARATUS AND METHOD

(71) Applicant: Thomas R. McGuffin, Daphne, AL (US)

(72) Inventor: Thomas R. McGuffin, Daphne, AL (US)

( * ) Notice: Subject to any disclaimer, the term of this patent is extended or adjusted under 35 U.S.C. 154(b) by 151 days.

(21) Appl. No.: 16/744,352

(22) Filed: Jan. 16, 2020

Related U.S. Application Data

(60) Provisional application No. 62/792,990, filed on Jan. 16, 2019.

(51) Int. Cl.
*C02F 1/32* (2023.01)
*E03F 5/22* (2006.01)

(52) U.S. Cl.
CPC . *C02F 1/32* (2013.01); *E03F 5/22* (2013.01)

(58) Field of Classification Search
None
See application file for complete search history.

(56) References Cited

U.S. PATENT DOCUMENTS

| | | | | |
|---|---|---|---|---|
| 5,376,281 A | * | 12/1994 | Safta | A61L 2/10 210/192 |
| 2008/0000844 A1 | * | 1/2008 | Ralph | C02F 1/72 210/192 |
| 2008/0017558 A1 | * | 1/2008 | Pollock | B01D 61/18 210/90 |
| 2009/0001029 A1 | * | 1/2009 | Denkewicz, Jr. | C02F 1/78 210/760 |

\* cited by examiner

*Primary Examiner* — Richard C Gurtowski
(74) *Attorney, Agent, or Firm* — J. Nevin Shaffer, Jr.

(57) ABSTRACT

A low pressure air-gas mixing apparatus and method includes a containment vessel where the containment vessel includes a back and a front and a left side and a right side and a top and a bottom. An air input line and an air discharge line are connected with the containment vessel where the air discharge line is located in a waste water lift station. At least one ultra-violet lamp within the containment vessel is provided such that air, from the air input line, within the containment vessel is exposed to ultra-violet light such that ozone is produced.

20 Claims, 7 Drawing Sheets

LOW PRESSURE AIR-GAS MIXING APPARATUS AND METHOD

CROSS REFERENCE TO RELATED APPLICATION

This application claims the benefit of previously filed U.S. provisional patent application No. 62/792,990 filed 16 Jan. 2019 for a "Low Pressure Air-Gas Mixing Apparatus and Method". The Applicant hereby claims the benefit of this provisional application under 35 U.S.C. §119. The entire content of this provisional application is incorporated herein by this reference.

FIELD OF THE DISCLOSURE

The present invention pertains to a low pressure air-gas mixing apparatus and method consisting of a containment vessel where the containment vessel includes a back and a front and a left side and a right side and a top and a bottom. An air input line and an air discharge line are connected with the containment vessel where the air discharge line is located in a waste water lift station. At least one ultra-violet lamp within the containment vessel is provided such that air, from the air input line, within the containment vessel is exposed to ultra-violet light such that ozone is produced.

BACKGROUND OF THE INVENTION

All living things produce waste until the day they die and their remains continue to do so at times. Waste is a natural byproduct of living but waste is usually odiferous. Fats, oils, grease ("FOG") produce odors that are difficult to treat. Waste is also often toxic and contact with untreated waste is an ongoing health issue in all populations. While there are, and have been, many attempts at solving these problems, none of the prior art of which Applicant is aware are the same or similar structurally as the present invention and none are as easy and economical to install and operate as Applicant's improved air-gas mixer for use, by way of example and not limitation, as a waste treatment device.

Thus, there is a need in the art for a process that addresses the aforementioned problems in a manner that is robust and flexible that will accommodate a full spectrum of treatment environments, including waste to be treated and various waste enclosure shapes and dimensions.

It therefore is an object of this invention to provide an improved low pressure air-gas mixing apparatus for treating odor and disease that is easy to use and economical to install and operate.

SUMMARY

Accordingly, a low pressure, air-gas mixing apparatus and method according to one preferred embodiment consists of a containment vessel where the containment vessel includes a back and a front and a left side and a right side and a top and a bottom. An air input line and an air discharge line are connected with the containment vessel where the air discharge line is located in a waste water lift station. At least one ultra-violet tamp within the containment vessel is provided such that air, from the air input line, within the containment vessel is exposed to ultra-violet light such that ozone is produced.

In one aspect, the waste water lift station includes an air cavity and fluid and the air discharge line is located in one or both of the air cavity and fluid in the waste water lift station.

In one aspect, the apparatus further includes an air blower connected with the air input line.

In one aspect, the apparatus further includes a cooling fan connected with the containment vessel.

In another aspect, the apparatus further includes conduits from the left side to the right side transverse to the air flow. In a further aspect, the conduits include operational wiring for the at least one ultra-violet light.

In another aspect, there are eighteen ultra-violet lamps.

In another aspect, an external support plate is connected to the outside of the containment vessel such that the support panel is spaced apart from the containment vessel.

In a further aspect, an internal support plate is connected inside the containment vessel where the internal support plate includes holes for air passage.

In one aspect, the cooling fan is connected with a cooling air conduit where the cooling air conduit is passes through the containment vessel but is sealed from the containment vessel such that cooling air does not enter into the containment vessel. In another aspect, there are more than one cooling air conduits According to another embodiment, a low pressure air-gas mixing apparatus consists of a containment vessel where the containment vessel includes a back and a front and a left side and a right side and a top and a bottom. An air input line is connected with the back of the containment vessel and an air discharge line is connected with the front of the containment vessel. An air blower is connected with the air input line and several ultra-violet lamps are connected within the containment vessel from the front to the back of the containment vessel such that air within the containment vessel from the air input line is exposed to ultra-violet light such that ozone is produced and further such that air introduced at the back by the air input line passes over and is mixed by the ultra-violet lamps prior to exiting the containment vessel at the front of the containment vessel in the air discharge line. A cooling fan is connected with the containment vessel and a power source is connected with the ultra-violet lamps for controlling the operation of the ultra-violet lamps. Conduits are provided from the left side to the right side transverse to the air flow where the conduits include operational wiring for the at least one ultra-violet light and the operation wiring is connected with the plurality of ultra-violet lights and the power source.

In one aspect, the air discharge line is located in a waste water lift station. In another aspect, the waste water lift station includes an air cavity and fluid and the air discharge line is located in one or both of the air cavity and discharges air directly into the air cavity of the waste water lift station. In a further aspect, the air discharge line is located in the fluid and discharges air directly into the fluid in the waste water lift station.

In one aspect, there are eighteen ultra-violet lamps.

In another aspect, the cooling fan is connected with a cooling air conduit where the cooling air conduit is passes through the containment vessel but is sealed from the containment vessel such that cooling air does not enter into the containment vessel. In a further aspect, there are more than one cooling air conduits According to another embodiment, a low pressure air-gas mixing method consists of:

a.) providing a containment vessel where the containment vessel includes a back and a front and a left side and a right side and a top and a bottom; an air input line connected with the containment vessel and an air discharge line connected with the containment vessel where the air discharge line is located in a waste water lift station; and at least one ultra-violet lamp within the containment vessel such that air, from the air input line, within the containment vessel is exposed to ultra-violet light such that ozone is produced; and, b.) activating the at least one ultra-violet light.

In one aspect, the waste water lift station includes an air cavity and fluid in the waste water lift station and locating the air discharge line selectively within the air cavity and the fluid.

In another aspect, the method further includes an air blower connected with the air input line.

In one aspect, the method further includes a cooling fan connected with the containment vessel.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF EMBODIMENTS

Figure 1:
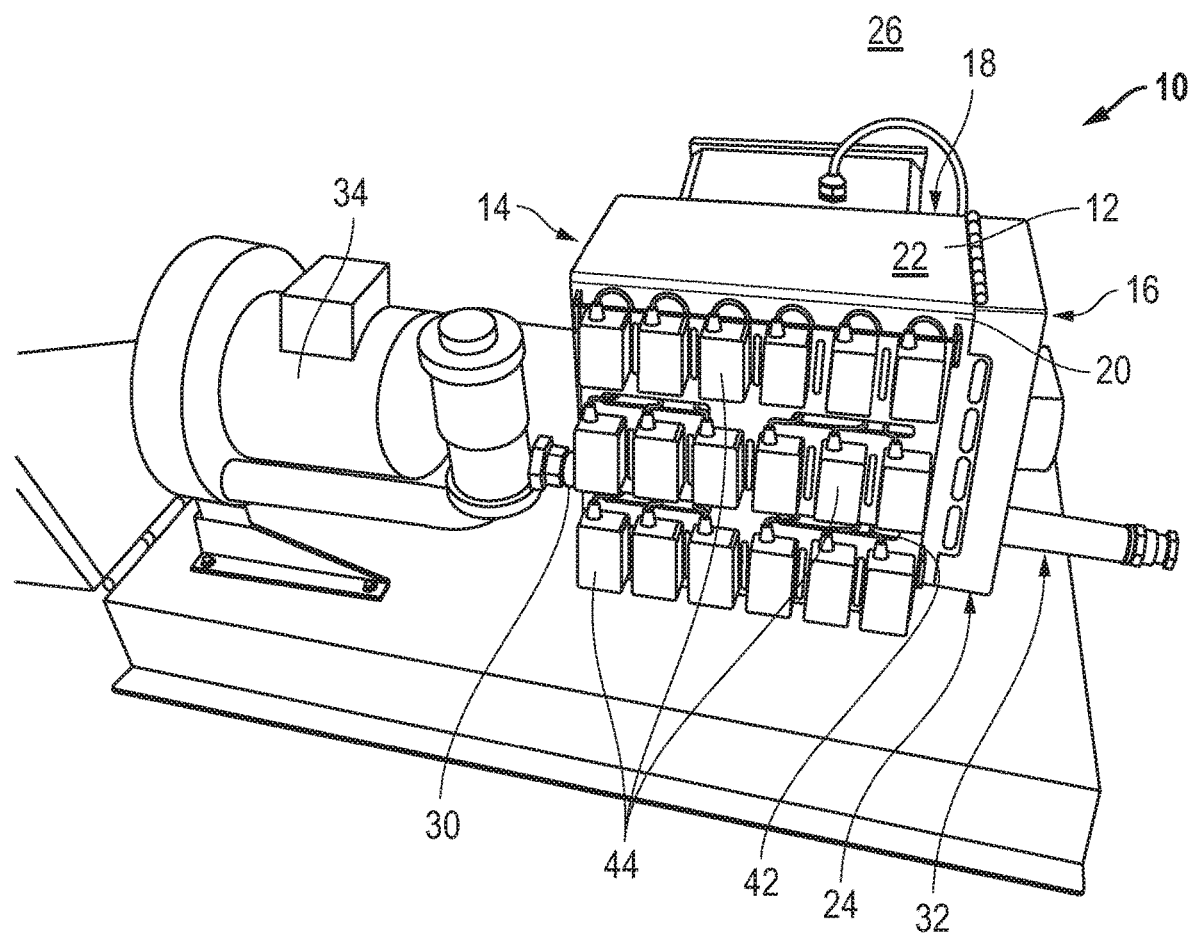
FIG. 1 is a side perspective view of the low pressure air-gas mixing apparatus of the present invention.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described method may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated. For example, further insubstantial approximations of the process and/or algorithms are also considered within the scope of the processes described herein.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

It should also be noted that a plurality of hardware and software based devices, as well as a plurality of different structural components, may be utilized to implement the invention. Furthermore, and as described in subsequent paragraphs, the specific configurations illustrated in the drawings are intended to exemplify embodiments of the invention and that other alternative configurations are possible.

Figure 2:
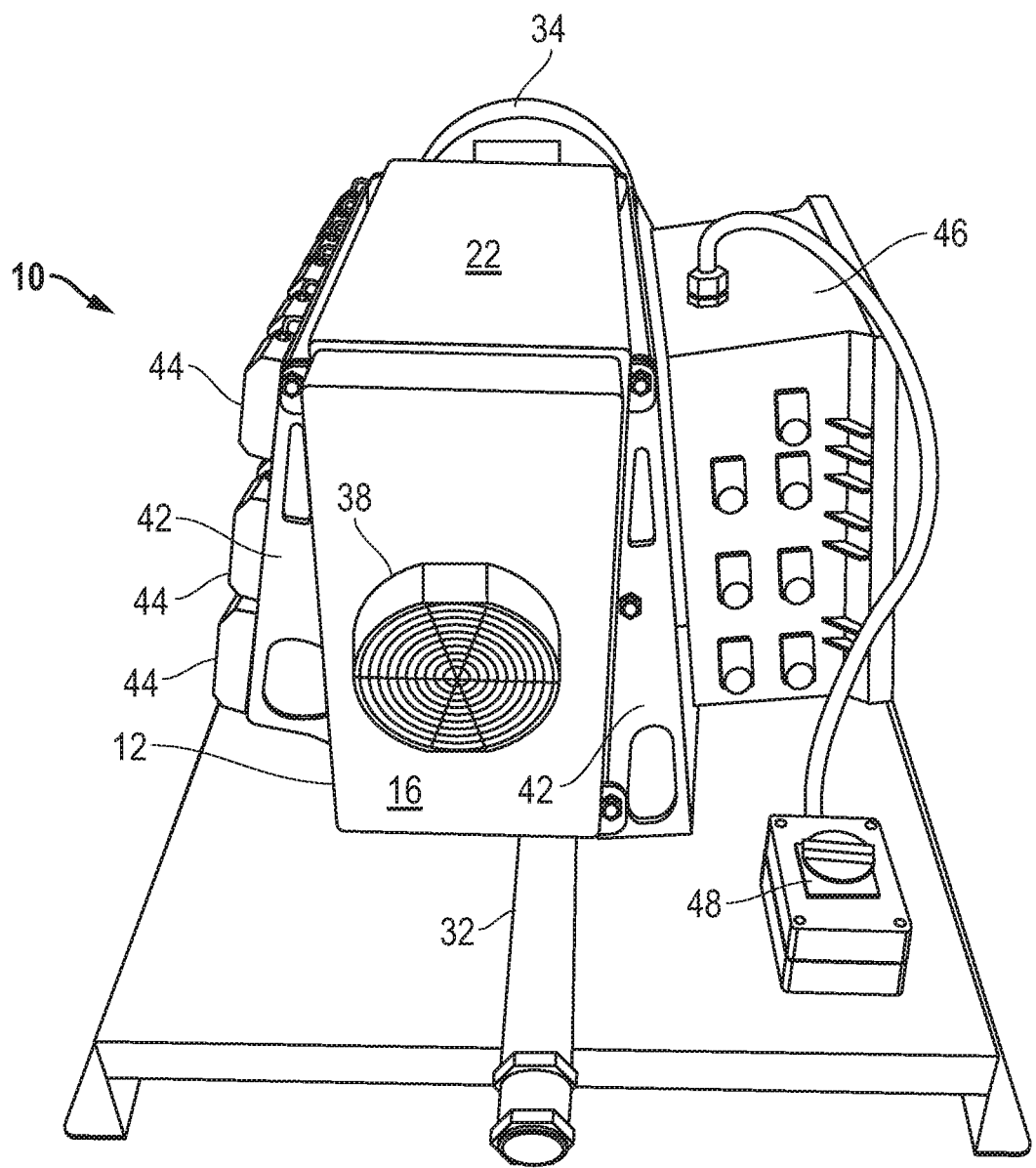
FIG. 2 is front perspective view of the invention of FIG. 1.
Figure 3:
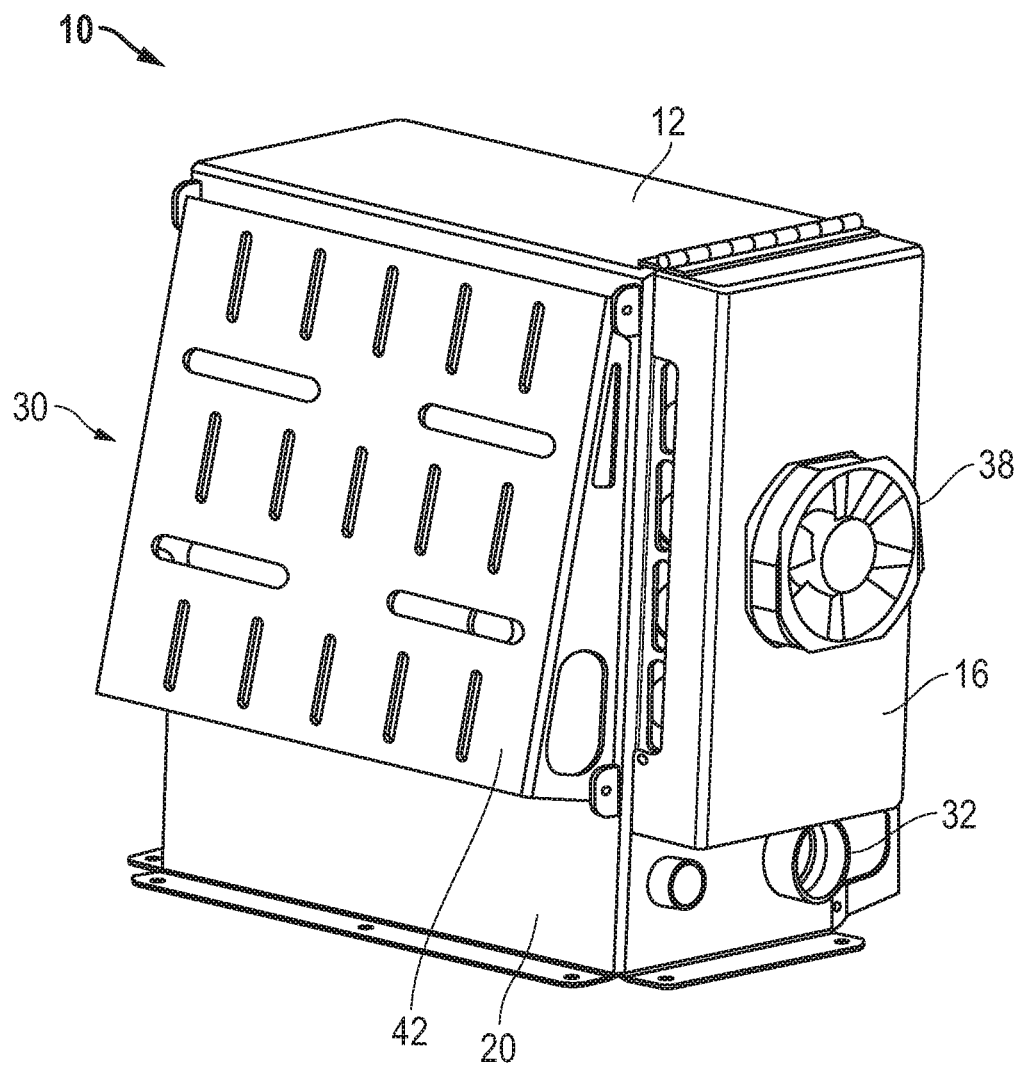
FIG. 3 is a perspective view of the invention of FIG. 1 showing the external support plate serving as a side heat shield and mounting plate.

One embodiment of the present invention is illustrated by way of example in FIGS. 1-7. Referring now to FIGS. 1, 2 and 3, low pressure air-gas mixer 10 includes a containment vessel 12 where the containment vessel 12 includes a back 14 and a front 16 and a left side 18 and a right side 20 and a top 22 and a bottom 24. Containment vessel 12 has an outside 26 and an inside 28 (See FIG. 4). An air input line 30 and an air discharge line 32 are connected with the containment vessel 12. Air input line 30 receives air from blower 34 and directs it to the inside 28 of containment vessel 12. At least one ultra-violet lamp 36 (See FIG. 4) located on the inside 28 of the containment vessel 12 is provided such that air, from the air input line 30, within the containment vessel 12 is exposed to ultra-violet light such that ozone is produced. The air-gas (ozone) combination leaves the containment vessel 12 through the air discharge line 32 as will be discussed more fully hereafter.

FIGS. 1, 2, and 3 also show a cooling fan 38 connected with the front 16 of containment vessel 12. Cooling fan 38 directs air into cooling conduits 40 (See FIG. 4) where the cooling air conduit(s) are located on the inside 28 of containment vessel 12 and pass through the containment vessel 12 but are sealed from the containment vessel 12 such that cooling air does not enter into the containment vessel 12.

An external support plate 42 is shown attached to both the left side 18 and right side 20 of containment vessel 12. As illustrated, for example only and not by limitation, the right side 20 external support plate 42 holds the ultra-violet ballasts 44 and the left side 18 external support plate 42 holds the starter and control panel 46. Power is connected with power switch 48 for operation of all the elements of the invention shown and described herein.

Importantly, external support plate(s) 42 are connected with containment vessel 12 such that the external support plates 42 are spaced apart from the left side 18 and right side 20. This structure creates an air gap/heat shield that protects the ballasts 44 and starter and control panel 46 from heat created by the operation of the ultra violet lamps 36 on the inside 28 of containment vessel 12. As shown, the external support plates 42 are "V" shaped with the legs facing down along the sides of the containment vessel 12 thus creating the desired spaced apart design from the sides of the containment vessel 12. Any other useful spacing structure may be used to create the air gap.

Figure 4:
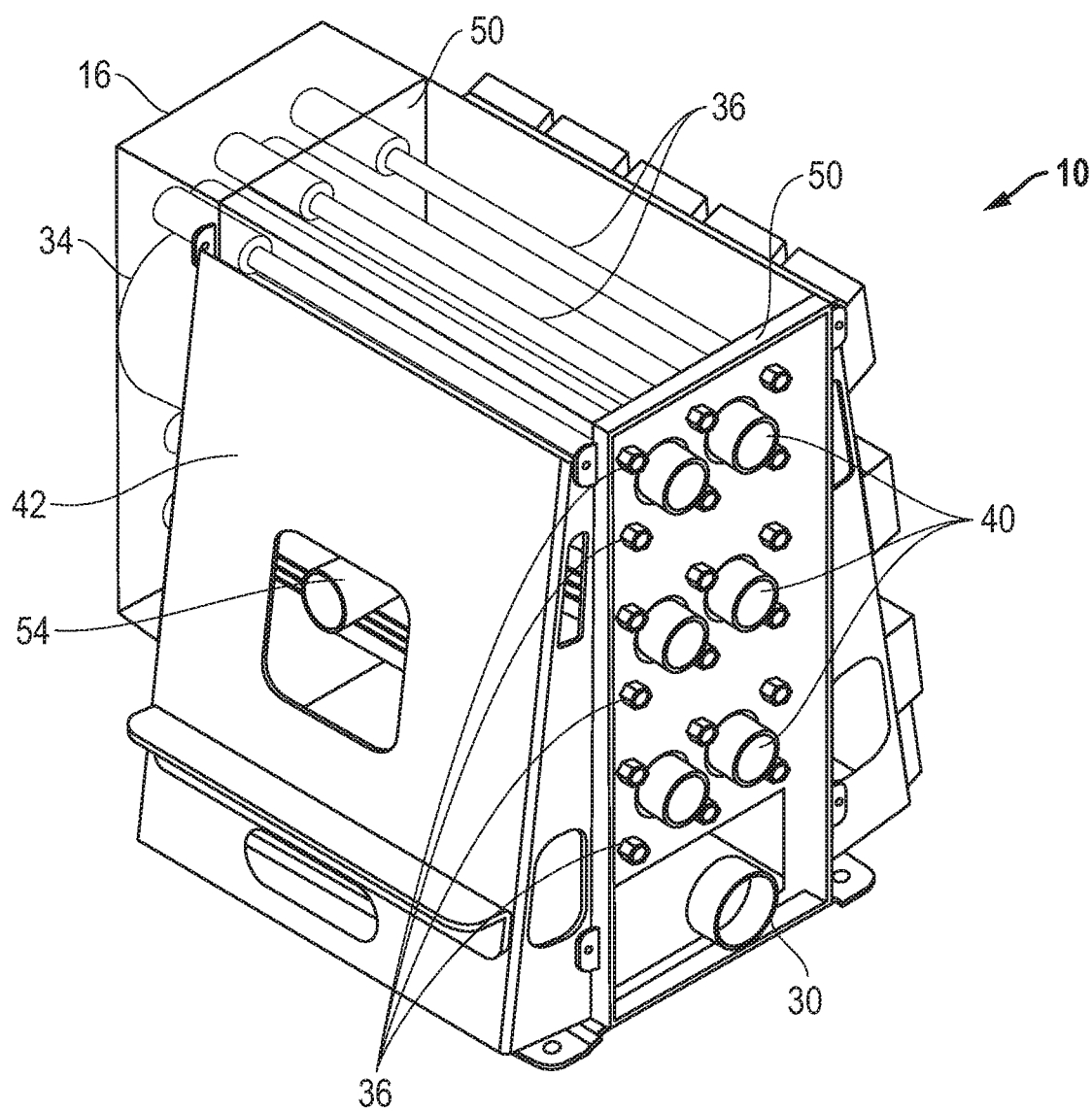
FIG. 4 is a rear partial cut away view of the invention of FIG. 1.

Referring now to FIG. 4, low pressure air-mixing apparatus 10 is shown in partial cut away form so as to show ultra violet lamps 38. Applicant prefers to have eighteen ultra violet lamps 38 arranged in six rows of three as shown. Certainly, other configurations are included within the scope of the invention.

Also illustrated is internal support plates 50. Internal support plates 50 support the ultra violet lamps 36 as well as cooling air conduits 40 as shown. Importantly, internal support plates 50 also serve as an air-gas mixer as air introduced by blower 34 moves over and around and through holes in the internal support plates 50. Similarly, conduits 54 pass from the left side 18 to the right side 20 on the inside 28 of containment vessel 12 transverse to the air flow introduced by blower 34 and also aid in mixing the air-gas combination on the inside 28 and ensuring all the air is exposed to the ultra violet lamps 36. Conduits 54 carry electrical wiring and connections (not shown) from the starter and control panel 46 to the ballasts 44.

Figure 5:
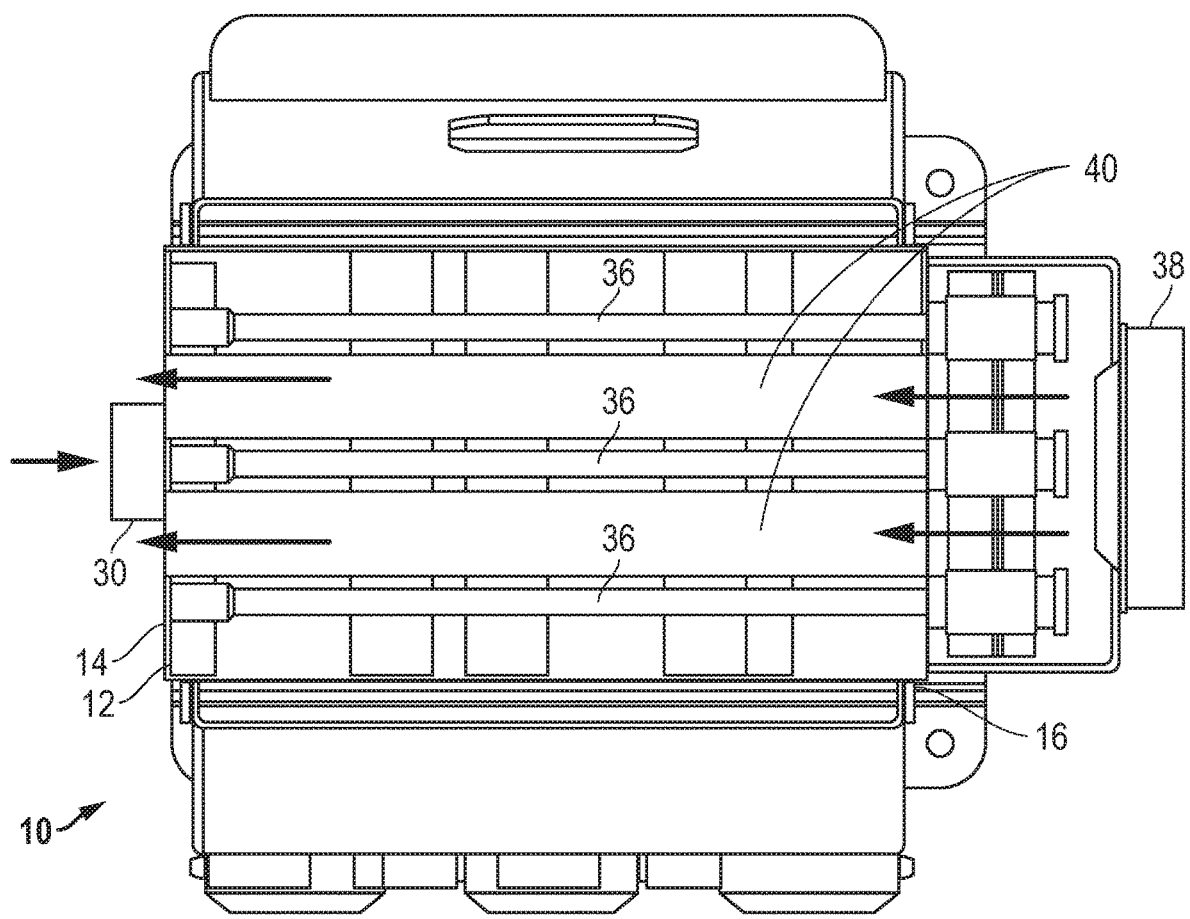
FIG. 5 is a top partial cut away view of the invention of FIG. 1.

Referring to FIG. 5, a top partial cut away view illustrates the flow of cooling air from cooling fan 38 at the front 16 pushing cooling air to the back 14 of containment vessel 12 while the air input line 30 introduces air to be treated from the blower 34 at the back 14 and forces it along and past ultra violet lamps 36 to the front 16 and through air discharge line 32.

Figure 6:
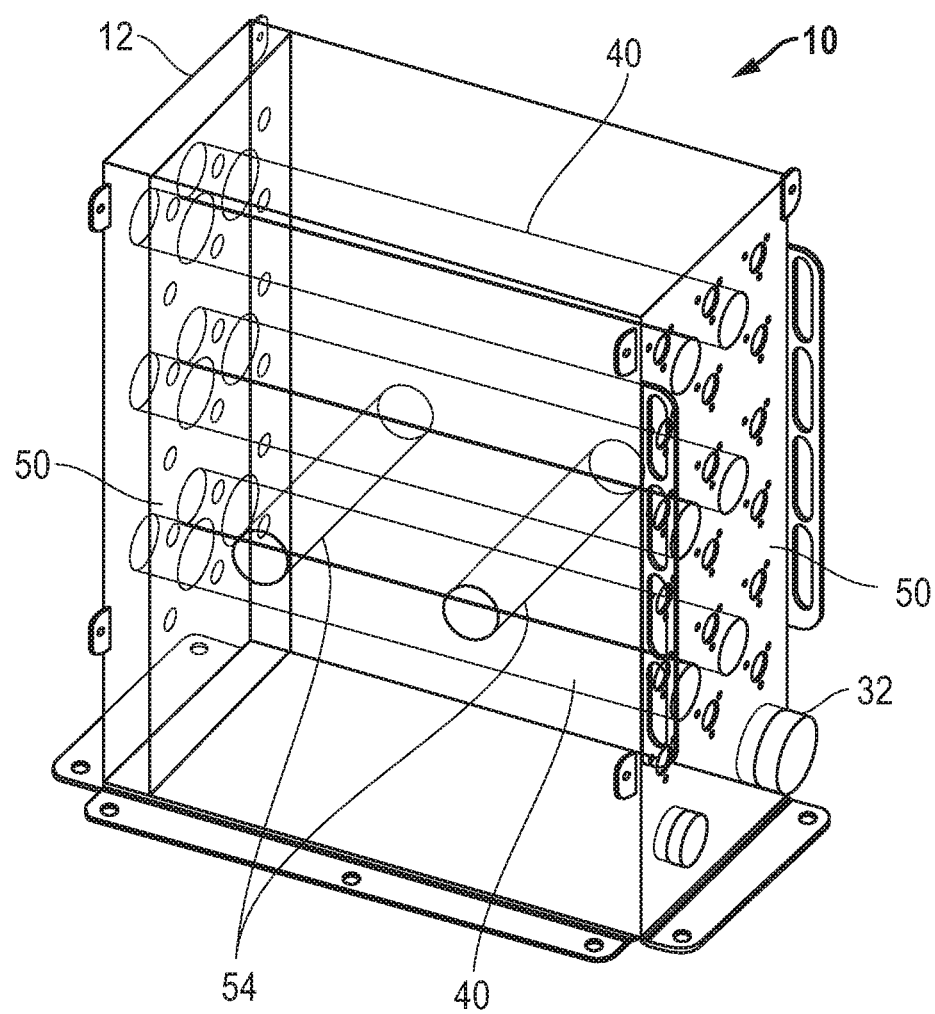
FIG. 6 is a side cut away perspective view showing more the interior of the containment vessel, the ultra-violet lamps and the transverse conduits and internal support plates of the invention of FIG. 1.

FIG. 6 is a cut away view illustrating the preferred relation and location of the internal support plates 50, the conduits 54 and the cooling air conduits 40.

Figure 7:
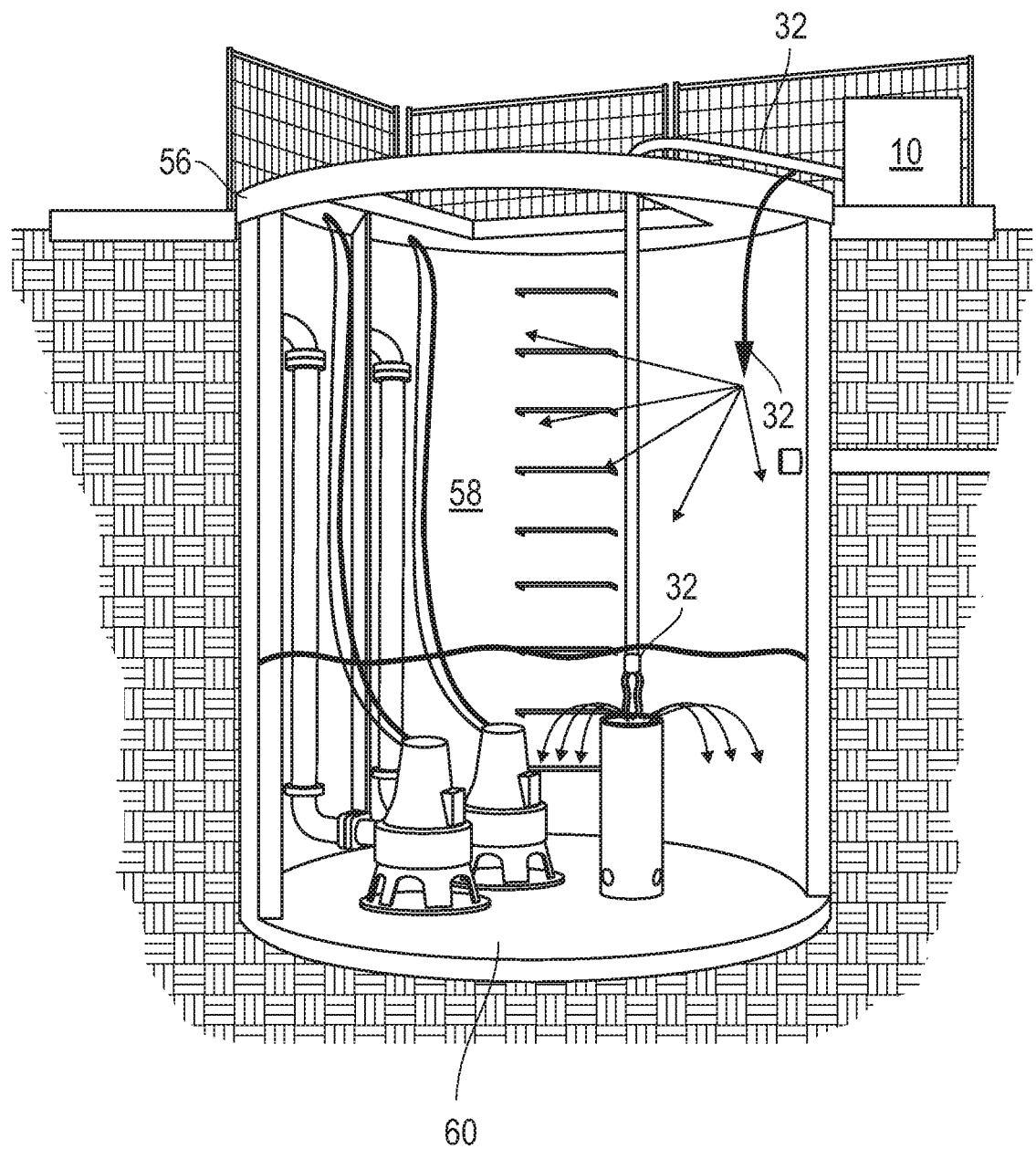
FIG. 7 is a side partially cut away perspective view of the invention of FIG. 1 in the "deployed" position within a waste treatment lift station.

Referring now to FIG. 7, a sewer lift station 56 is shown in a partial cut away view. Sewer lift station 56 includes an air cavity 58 and fluid 60, In use, Applicant's low pressure air-gas mixing apparatus 10 is operated as discussed above and illustrated such that ozone gas is discharged from containment vessel 12 through discharge line 32. Discharge line 32 may be placed such that it is only in air cavity 58 or only in fluid 60 or in both air cavity 58 and fluid 60 as deemed most useful.

By way of further description, the present invention consists of a single, or multi-, chambered containment vessel, preferably made of a metallic and corrosion resistant material such as stainless steel, by way of example only and not by limitation. The containment vessel includes a series of internal support, mixing, plates, as may be deemed useful, as well as conduit pipes, for example only, located transverse to air flow for example only, so as to assure the efficient mixing of ambient air with other gases. Preferably, cooling conduit pipes extend from the front to the back of the containment vessel to provide required cooling for the containment vessel and to assure proper mixing of the gases as well. Other pipes or conduits, as illustrated, extend from side to side to offer a conduit for running wires, to also serve as an internal deflector and mixer of air and gasses and to provide additional heat control. The design and strategic location of the cooling air conduits 40 and the other conduits 54 as well as the internal support plates 50 play an integral part in cooling the internal aspirated air stream which significantly enhances the transfer of UV ozone into the final air stream prior to discharge.

Preferably, a pair of heat shields/mounting devices, external support plates 42, are connected to the sides of the containment vessel. The heat shields/mounting devices shield various electrical components on the outside of the containment vessel from heat and also provide a mounting location for required electrical components, as shown in the figures. They may be adjusted and removed as desired.

An internal support plate 50 is provided which includes a number of ports of various size configured to support and accommodate ultra-violet lamps and bulbs 36 of various lengths and diameters as deemed useful. The internal support plate also provides for additional air-gas mixing.

The containment vessel is scalable in size and may be coated with material to enhance aesthetics, aid in cooling, or prevent corrosion from both internal and external sources. The present invention provides a low-pressure, high-volume air flow in the pressure range, preferably, of .025 to 15 psi. The primary use of the present invention is for the creation and introduction of gaseous and other volatile substances into an air stream or fluid (See FIG. 7), with the aid of an external air supply system, such as blower 34. It is specifically designed as an ozone mixer but can provide other gases and other vapor-phase liquids as well.

There have been many heat exchangers and mixers but Applicant's apparatus and method is unique in it structure and in that it is designed preferably for the provision of ozone into an air/liquid milieu. Further, the structure includes multiple heat exchanger elements that remove process debilitating heat energy engendered in the process from the ultra-violet wavelengths used to form the ozone, a problem not adequately addressed in the past.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. An air-gas mixing apparatus comprising:
   a.) a containment vessel wherein the containment vessel includes a back and a front and a left side and a right side and a top and a bottom;
   b.) an air input line connected with the containment vessel at the back of said containment vessel and an air discharge line connected with the containment vessel at the front of said containment vessel wherein said air discharge line is located in a waste water lift station and wherein low pressure air is introduced by said air input line to said containment vessel in a range from .025 to 15 pounds per square inch;
   c.) at least one ultra-violet lamp within said containment vessel such that air, from the air input line, within said containment vessel is exposed to ultra-violet light such that ozone is is produced; and
   d. a cooling fan connected with the containment vessel at the front of said container wherein the cooling fan is configured to direct air through cooling air conduits from the front of said containment vessel and out of the back of said containment vessel.

2. The apparatus of claim 1 wherein said waste water lift station includes an air cavity and fluid and said air discharge line is located in one or both of the air cavity and fluid in said waste water lift station.

3. The apparatus of claim 1 further including an air blower connected with said air input line.

4. The apparatus of claim 1 further including conduits configured to carry operational wiring from the left side to the right side of said containment vessel transverse to air flow through said containment vessel.

5. The apparatus of claim 1 further including an external support plate connected to the outside of the containment vessel such that the support plate is spaced apart from the containment vessel by an air gap.

6. The apparatus of claim 1 further including an internal support plate connected within the containment vessel from the left side to the right side of said containment vessel where the internal support plate includes holes for air passage.

7. The apparatus of claim 1 wherein the cooling fan is connected with a cooling air conduit where said cooling air conduit is passed through the containment vessel but is sealed from the containment vessel such that cooling air does not enter into the containment vessel.

8. The apparatus of claim 7 wherein there are more than one cooling air conduits.

9. An air-gas mixing apparatus comprising:
   a.) containment vessel wherein the containment vessel includes a back and a front and a left side and a right side and a top and a bottom;
   b.) an air input line connected with the back of the containment vessel and an air discharge line connected with the front of the containment vessel;
   c.) an air blower connected with said air input line;
   d.) a plurality of ultra-violet lamps connected within said containment vessel from the front to the back of the containment vessel such that air within said containment vessel from the air input line is exposed to ultra-violet light such that ozone is produced and further such that air introduced at the back by the air input line passes over and is mixed by the plurality of ultra-violet lamps prior to exiting the containment vessel at the front of the containment vessel in said air discharge line;
   e.) cooling fan connected with the containment vessel at the front of the containment vessel wherein the cooling fan is configured to direct air through cooling air conduits from the front of said containment vessel and out of the back of said containment vessel;
   f.) a power source connected with said plurality of ultra-violet lamps for controlling the operation of said plurality of ultra-violet lamps;
   g.) conduits from the left side to the right side of said containment vessel transverse to air flow through said containment vessel wherein said conduits include operational wiring for said plurality of ultra-violet lamps and said operational wiring is connected with said plurality of ultra-violet lamps and said power source;
   h.) an external support plate connected to the outside of the containment vessel such that the support plate is spaced apart from the containment vessel by an air gap; and
   i.) an internal support plate connected within the containment vessel from the left side to the right side of said containment vessel where the internal support plate includes holes for air passage.

10. The apparatus of claim 9 wherein said air discharge line is located in a waste water lift station.

11. The apparatus of claim 10 wherein said waste water lift station includes an air cavity and fluid and said air discharge line is located in one or both of the air cavity and fluid and discharges air directly into the air cavity of said waste water lift station.

12. The apparatus of claim 11 wherein said air discharge line is located in the fluid and discharges air directly into the fluid in said waste water lift station.

13. The apparatus of claim 9 wherein said cooling air conduits pass through the containment vessel but are sealed from the containment vessel such that cooling air does not enter into the containment vessel.

14. An air-gas mixing method comprising:
   a.) providing a containment vessel wherein the containment vessel includes a back and a front and a left side and a right side and a top and a bottom; an air input line connected with the containment vessel at the back of said containment vessel and an air discharge line connected with the containment vessel at the front of said containment vessel wherein said air discharge line is located in a waste water lift station and wherein low pressure air is introduced by said air input line to said containment vessel in a range from .025 to 15 pounds per square inch; and at least one ultra-violet lamp within said containment vessel such that air, from the air input line, within said containment vessel is exposed to ultra-violet light such that ozone is produced and a cooling fan connected with the containment vessel at the front of the containment vessel wherein the cooling fan is configured to direct air through cooling air conduits from the front of said containment vessel and out of the back of said containment vessel; and
   b.) activating the at least one ultra-violet light.

15. The method of claim 14 wherein the waste water lift station includes an air cavity and fluid in said waste water lift station and locating the air discharge line selectively within the air cavity and the fluid.

16. The method of claim 14 further including an air blower connected with said air input line.

17. The apparatus of claim 9 wherein to pressure air is introduced to said containment vessel by said air input in range from .025 to 15 pounds per square inch.

18. The method of claim 14 wherein the cooling fan is connected with a cooling air conduit where said cooling air conduit is passed through the containment vessel but is sealed from the containment vessel such that cooling air does not enter into the containment vessel.

19. The method of claim 18 wherein there are more than one cooling air conduits.

20. The method of claim 15 wherein said air discharge line is located in the fluid and discharges air directly into the fluid in said waste water lift station.

* * * * *